Figure 1:
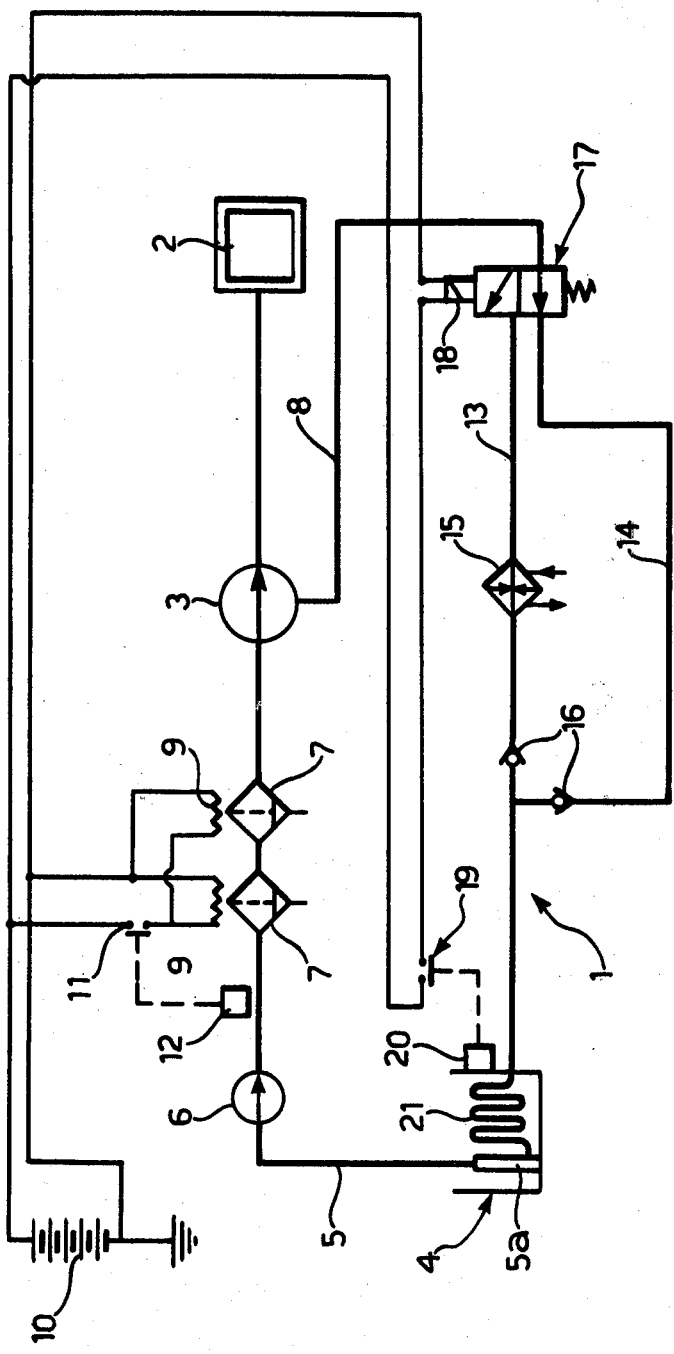

United States Patent [19]

Gallione et al.

[11] 4,228,776
[45] Oct. 21, 1980

[54] FUEL FEED SYSTEM FOR AN INTERNAL COMBUSTION ENGINE

[75] Inventors: Bruno Gallione, Rivalta; Carlo Frascisco, Turin, both of Italy

[73] Assignee: Fiat Veicoli Industriali S.p.A., Turin, Italy

[21] Appl. No.: 23,503

[22] Filed: Mar. 23, 1979

[30] Foreign Application Priority Data

Apr. 17, 1978 [IT] Italy .............................. 67855 A/78

[51] Int. Cl.³ ............................................. F02M 31/00
[52] U.S. Cl. ................................... 123/549; 123/552; 123/557
[58] Field of Search ........... 123/122 R, 122 E, 122 F, 123/122 H, 142.5

[56] References Cited

U.S. PATENT DOCUMENTS

| | | | |
|---|---|---|---|
| 3,354,872 | 11/1967 | Gratzmuller | 123/122 E X |
| 3,699,938 | 10/1972 | Frazier | 123/122 E |
| 4,180,036 | 12/1979 | Wolf | 123/122 F |

*Primary Examiner*—Harry N. Haroian

*Attorney, Agent, or Firm*—Sughrue, Rothwell, Mion, Zinn and Macpeak

[57] ABSTRACT

A fuel feed system for an internal combustion engine, of the type in which a fuel line from a fuel tank contains a fuel feed pump for supplying fuel under pressure to at least one fuel injection pump operating to inject fuel into the internal combustion engine, the injection pump having an outlet for excess fuel connected to a return line leading back to the fuel tank. In this return line there are two branches, one of them containing a heater for heating fuel flowing in that branch of the return line; a solenoid valve selectively energized in dependence on the fuel temperature in the tank causes the fuel to flow in the heater-containing branch of the return line when the fuel temperature in the tank is below a selected minimum. Filters in the fuel feed line are provided with heaters energized in dependence on the fuel temperature in the fuel feed line immediately downstream of the filter. A further branch in the return line is provided with a fuel refrigerator for cooling fluid on its way to the tank when the fuel temperature in the tank exceeds a selected maximum value.

4 Claims, 2 Drawing Figures

FUEL FEED SYSTEM FOR AN INTERNAL COMBUSTION ENGINE

The present invention relates generally to a fuel feed system for an internal combustion engine. In particular the present invention relates to a fuel feed system of the type comprising a fuel tank, a fuel feed duct leading from the fuel tank to an injection pump for feeding fuel to an internal combustion engine, a feed pump in the fuel feed duct, for feeding fuel from the fuel tank to the injection pump, at least one fuel filter in the fuel feed duct, upstream of the injection pump, and a duct for return to the tank of excess fuel fed by the fuel feed pump to the injection pump.

The technical problem which the present invention seeks to solve is that of providing a fuel feed system of the general type described above which is further provided with means for maintaining the temperature of the fuel to be fed to the internal combustion engine within a predetermined range of temperatures considered necessary for optimum operation of the internal combustion engine.

According to the present invention, there is provided a fuel feed system for an internal combustion engine, comprising a fuel tank, a fuel feed duct leading from the fuel tank to an injection pump for feeding fuel to the internal combustion engine, a fuel feed pump in the fuel feed duct for feeding fuel from the fuel tank to the injection pump, at least one fuel filter in the fuel feed duct upstream of the injection pump, and a return duct leading back to the fuel tank for excess fuel fed by the fuel feed pump to the injection pump, in which the fuel filter is provided with an electrical resistance operable, when energised, to heat by the Joule effect fuel passing through the filter, and connectable to an electrical source by means of a first electrical switch the closing and opening of which is controlled, by a first temperature sensor positioned to sense the temperature of the fuel in the fuel feed duct at a point upstream of the filter, in siuch a way that the first electrical switch is closed when the temperature of the fuel at the said point upstream of the filter is lower than a first threshold value, and in which there is a solenoid valve having an inlet in the return duct downstream of the injection pump and two outlets, the solenoid valve being operable selectively to direct fuel flowng in the return duct into one or other of two branch ducts connected to the two outlets thereof, there being a heater in a first of the two branch ducts which conveys fuel therein into the fuel tank, the second of the two branch ducts rejoining the first branch duct upstream of the fuel tank, the solenoid valve being electrically connectable to the electrical sourse by means of a second electrical switch, the closing and opening of which is controlled, by a second temperature sensor positioned to sense the temperature of the fuel in the fuel tank, in such a way that fuel is directed by the solenoid valve into the first branch duct when the second sensor senses that the temperature of the fuel in the tank is lower than a second threshold value, which is higher than the said first threshold value; the said first branch duct having an end portion of sinuous form within the fuel tank.

The main advantage of the fuel feed system of the present invention lies in the fact that it allows the temperature of the fuel fed to the engine to be brought in a relatively short time into the desired temperature range in conditions when the fuel temperature lies outside the temperature range.

A preferred embodiment of the present invention is further characterised by the fact that there is provided a further solenoid valve in the second branch duct the further solenoid valve being operable selectively to direct fuel in the second branch duct into a continuation of the second branch duct or into a third branch duct which extends separately into the fuel tank, the said continuation of the second branch duct having a fuel refrigerator therein, the further solenoid valve being electrically connectable to the electrical source by means of a third electrical switch the closing and opening of which is also controlled by the sensor sensitive to the temperature of the fuel in the fuel tank in such a way that the further solenoid valve directs fuel into the continuation of the second branch duct when the temperature of the fuel in the fuel tank is greater than a third threshold value, which is greater than the second threshold value, whereby to effect cooling of the excess fuel being returned to the fuel tank from the injection pump.

Preferably, there is further provided a communication duct interconnecting the first branch duct, at a point downstream of the heater, and the third duct, the communication duct being provided with a non-return valve for preventing fuel from flowing from the third duct towards the first branch duct, and with a fuel flow control valve which is controlled, in dependence on the temperature of the fuel in the first duct downstream of the said heater, sensed by a further temperature sensor, in such a way as to cause the fuel flow through the communication duct to vary in a manner which is inversely proportional to the variation of the temperature of the fuel in the first branch duct downstream of the heater.

Figure 2:
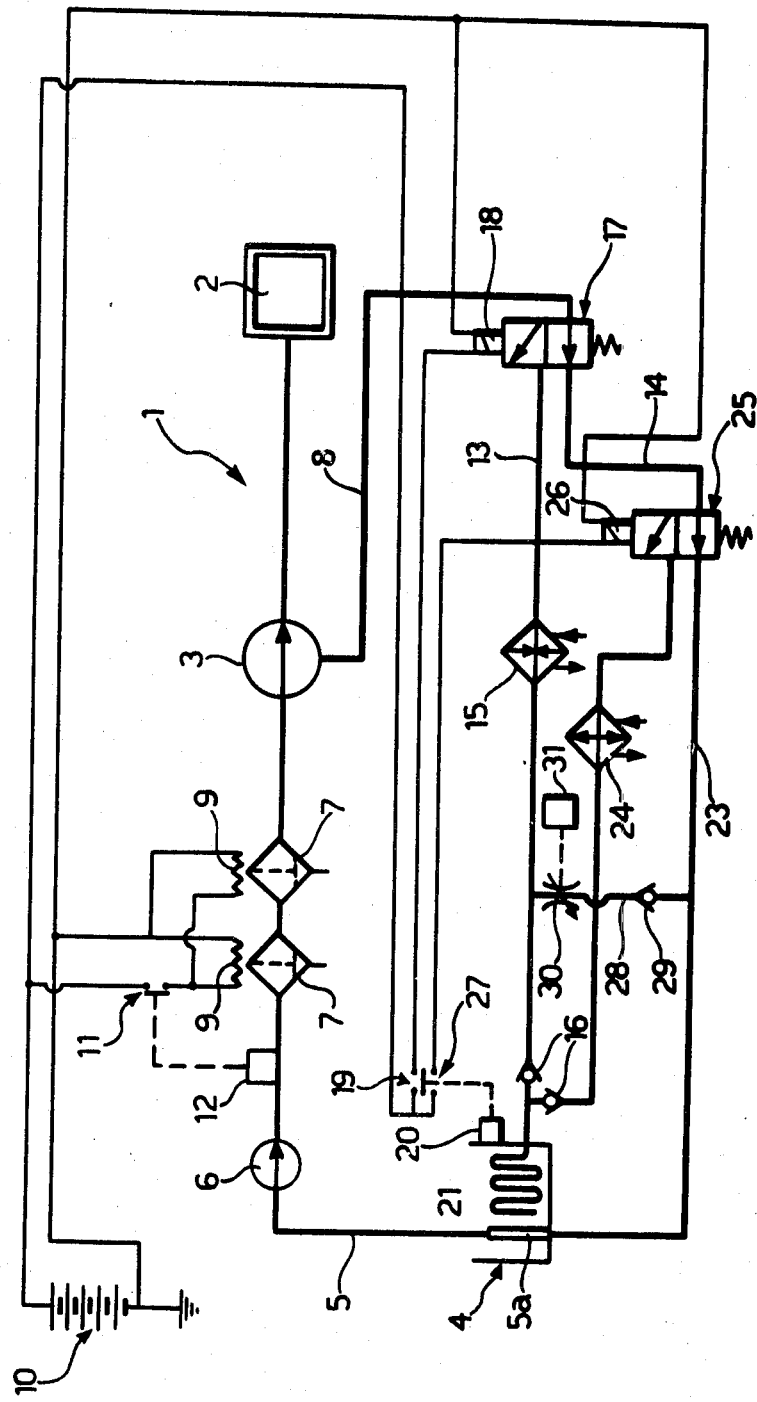

Two embodiments of the present invention will now be more particularly described, by way of example, with reference to the accompanying drawings, in which:

FIG. 1 is a schematic diagram illustrating a feed system formed as a first embodiment of the invention, and FIG. 2 is a schematic diagram illustrating a feed system formed as a second embodiment of the invention.

Referring now to the drawings there is shown, generally indicated by the reference numeral 1, a fuel feed system for an internal combustion engine 2 of the type having a cylinder or a plurality of cylinders and one or more injectors (not shown) for injecting fuel into the cylinder. The fuel feed system 1 includes an injection pump 3 for feeding fuel to the injector or injectors of the motor 2; the injection pump 3 is of a known type provided with a return flow outlet for fuel fed in excess of the quantity of fuel required by the injector or injectors for feeding into the cylinder or cylinders of the internal combustion engine 2. The fuel feed system 1 also includes a fuel tank 4, a fuel feed duct 5 leading from the tank 4 to the injection pump 3, a feed pump 6 in the duct 5 for feeding fuel from the tank 4 along the fuel feed duct 5 to the injection pump 3, two fuel filters 7 located between the feed pump 6 and the injection pump 3, and a return flow duct 8 for return to the fuel tank 4 of excess fuel fed to the injection pump 3.

Each filter 7 is provided with an electrical resistance 9 operable when energised to heat by the Joule effect fuel which passes through the associated filter. The two electrical resistances 9 are connected in parallel across an electrical supply source 10 which, in the case of an engine mounted on a motor vehicle, may be constituted for example by the battery which feeds the electrical system of the said motor vehicle. The circuit includes an electrical switch 11 which, when open, interrupts the flow of current to the resistances 9, and when closed completes the circuit to the resistances so that these are energised to heat the fuel passing the filters 7. The switch 11 is controlled by a sensor 12 which is sensitive to the temperature of the fuel flowing through the fuel feed duct 5 at a point immediately upstream of the filters 7; this sensor operates to control the closure of the electrical switch 11 when the temperature of the fuel upstream of the filters 7 falls below a certain first threshold value. Upon closure of the switch 11 the resistances 9 start heating the fuel and can in fact raise its temperature above the said first threshold value. This first threshold temperature is above that at which, for example in cold starting conditions of the motor 2, the fuel might throw a precipitation of paraffin wax, or of other components contained in the fuel, within the filters 7 with consequent disadvantages as far as the flow of fuel through the said filters is concerned.

Downstream from the injection pump 3 there is a solenoid valve 17 in the return duct 8. The outlets from the solenoid valve 17 are connected to two separate ducts 13, 14. In the duct 13 there is inserted a fuel heater 15 which can be constituted, for example, by a heat exchanger drawing heat from the exhaust gases from the engine 2, or by a heat exchanger drawing heat from the engine coolant liquid, or else by a heat generator. In both the duct 13, and in the duct 14 which rejoins the duct 13 downstream of the heater 15, there is inserted a respective non-return valve 16 for preventing the flow of fuel along these ducts from the tank 4 towards the injection pump 3. The solenoid valve 17 is operable to feed excess fuel coming from the injection pump 3 selectively into one or other of the two ducts 13, 14 in dependence on whether or not it is energised. The solenoid valve 17 is of a known type having a movable valve member displaceable between two operating positions, resilient means for urging the movable valve member towards one of its two operating positions, which it occupies when the valve is not energised, and an electromagnet (generally indicated 18 in the drawing) for causing, when energised, the displacement of the movable valve member of the solenoid valve to the other of its two operating positions.

The electromagnet 18 of the solenoid valve 17 is electrically connected, across the electrical source 10 by a circuit including a switch 19 and is operable, when energised upon closure of the switch 19, to cause displacement of the movable member of the solenoid valve into the said other position thereof, in which position the valve 17 directs fuel coming from the duct 8 to flow into the duct 13. The operation of the switch 19 is controlled by a temperature sensor 20 which is sensitive to the temperature of the fuel contained in the tank 4. This sensor 20 controls the electrical switch 19 to close when the temperature of the fuel contained in the tank 4 falls below a second threshold value, the said second threshold value being greater than the said first threshold value to which the temperature sensor 12 is calibrated.

This second threshold value is the lowest value of the fuel temperature at which the operation of the engine 2 is optimum. The heater 15 permits, moreover, a reduction in the operating time of the electrical resistance 9 when the temperature of the fuel is lower than the said first threshold value.

The duct 13 has an end portion 21 of sinuous or meandering form immersed in the fuel contained in the tank 4 and terminating closely adjacent an inlet mouth 5a through which the fuel in the tank 4 is drawn into the duct 5. This acts as a heat exchanger coil promoting the transfer of heat from the fuel in the duct 21 to the fuel in the tank 4.

The necessity of maintaining the fuel fed to the motor 2 at least above these minimum temperature levels is also a consequence of the fact that at low temperatures the fuel can exhibit an excessive viscosity value which interferes with the normal flow of fuel through the fuel feed duct to the engine, and can strongly reduce the atomisability of the fuel with consequent disadvantages during combustion.

The second embodiment of the invention, which is illustrated in FIG. 2, is arranged to accommodate those circumstances when it is necessary to limit the temperature of the fuel to a value below a maximum above which optimum function of the engine 2 will no longer be obtained. At high fuel temperatures there can be formed gas bubbles in the liquid fuel, which is obviously a disadvantage from the point of view of the injection of the fuel into the cylinders of the engine 2.

In FIG. 2 those parts of the system which are common to the system of FIG. 1 have been indicated with the same reference numerals. Referring now to FIG. 2 the feed system illustrated includes a second solenoid valve 25 in the duct 14; the solenoid valve 25 has two outlets connected one to a continuation of the duct 14 and the other to a duct 23. In the continuation of the duct 14 there is inserted a refrigerator 24, whilst the duct 23 flows directly into the fuel tank 4 adjacent the inlet mouth 5a.

The second solenoid valve 25 has an electromagnet 26 which is connected across the electrical source 10 by a circuit including contacts 27 of the switch 19 which, in this embodiment, is a two way switch controlled by the fuel tank temperature sensor 20. The contacts are closed by the temperature sensor 20, whereby to energise the electromagnet 26, when the temperature of the fuel in the tank 4 is greater than a third threshold value, which is higher than the second threshold value. When the electromagnet 26 is energised a movable member of the second solenoid valve 25 is displaced to a position thereof in which it directs the fuel into the continuation section of the duct 14 which is disposed downstream of the solenoid valve 25.

When, on the other hand, the temperature of the fuel in the tank 4 lies below the said third threshold value but above the said second threshold value, neither of the electromagnets 18 or 26 is energised since both of the electrical contacts 19, 27 are open. Consequently, in these conditions, the excess fuel returned from the injection pump 3 flows first through the duct 8, then into duct 14 and then into the duct 23, without being subject to any temperature variations before being returned to the tank 4. The temperature range between these two threshold values is, in fact, that considered to be the optimum temperature range for the fuel, within which range of fuel temperatures a good operation of the engine 2 is obtained.

The feed system illustrated in FIG. 2 includes moreover a duct 28 which interconnects the duct 13, downstream of the heater 15, and the duct 23. In the duct 28 there are inserted a non-return valve 29, intended to prevent return flow of the fuel from the duct 23 towards the duct 13, and a flow control valve 30. A fuel temperature sensor 31 senses the temperature of the fuel in the duct 13 at a point downstream of the heater 15 and operates to control the valve 30 in such a way as to cause a variation of the fuel flow through the duct 28 which is inversely proportional to the variation of the temperature of the fuel which flows through the duct 13 downstream of the heater 15.

The fuel which flows into the tank 4 through the sinuous end portion 21 of the duct 13 heats the fuel already present in the tank 4. The valve 30 permits that part of the total fuel flow which passes through the sinuous end portion 21 to be reduced little by little as the temperature of the fuel in the duct 13 falls, for the purpose of maintaining the temperature of the fuel drawn from the tank 4 as constant as possible.

For the purpose of minimising heat transfer to or from the fuel except at the points desired the walls of the ducts 13, 33, 28, 23 can be thermally insulated.

What is claimed is:

1. In a fuel feed system for an internal combustion engine, of the type comprising:
   a fuel tank,
   an injection pump,
   a fuel feed duct leading from said fuel tank to said injection pump for feeding fuel to said internal combustion engine,
   a fuel feed pump in said fuel feed duct for feeding fuel from said fuel tank to said injection pump,
   at least one fuel filter in said fuel feed duct upstream of said injection pump, and
   a return duct leading back to said fuel tank for excess fuel fed by said fuel feed pump to said injection pump,
   the improvement wherein
   said fuel filter is provided with an electrical resistance,
   a first electrical switch,
   a first temperature sensor positioned to sense the temperature of the fuel in said fuel feed duct at a point upstream of said filter,
   said electrical resistance operating, when energised, to heat by the Joule effect fuel passing through said filter, and being connectable to an electrical source by means of said first electrical switch the closing and opening of which is controlled by said first temperature sensor in such a way that said first electrical switch is closed when the temperature of the fuel at said point upstream of said filter is lower than a first threshold value,
   a solenoid valve having an inlet in said return duct downstream of said injection pump, and two outlets,
   first and second branch ducts connected to said outlets, said first branch duct leading in to said fuel tank, an end portion of said first branch duct being of sinuous form within said fuel tank and said second branch duct joining said first branch duct upstream of said tank
   said solenoid valve operating selectively to direct fuel flowing in said return duct into one or other of said first and second branch ducts connected to said two outlets thereof,
   a heater in said first branch duct,
   a second electrical switch,
   a second temperature sensor positioned to sense the temperature of the fuel in the fuel tank, said solenoid valve being electrically connectable to the electrical source by means of said second electrical switch the closing and opening of which is controlled by said second temperature sensor in such a way that fuel is directed by said solenoid valve into said first branch duct when the second sensor senses that the temperature of the fuel in said tank is lower than a second threshold value, which is higher than said first threshold value.

2. The fuel feed system of claim 1, wherein said first branch duct and said second branch duct are each provided with a non-return valve for preventing the return flow of fuel towards said injection pump.

3. The fuel feed system of claim 1, wherein there is provided a further solenoid valve located in said second branch duct, said further solenoid valve having two outlets, one connected to a continuation of said second branch duct and the other connected to a third branch duct which extends separately into said fuel tank, said second solenoid valve operating selectively to direct fuel in said second branch duct into said continuation of said second branch duct, or into said third branch duct,
   a fuel refrigerator in said continuation of said second branch duct
   a third electrical switch, said further solenoid valve being electrically connectable to the electrical source by said third electrical switch the closing and opening of which is also controlled by said sensor sensitive to the temperature of the fuel in said fuel tank in such a way that said further solenoid valve directs fuel into said continuation of said second branch duct when the temperature of the fuel in said fuel tank is greater than a third threshold value, which is greater than said second threshold value, whereby to effect cooling of the excess fuel being returned to said fuel tank from said injection pump.

4. The fuel feed system of claim 3, wherein there is further provided a communication duct interconnecting said first branch duct, at a point downstream of said heater therein, and said third duct,
   a non-return valve in said communication duct for preventing fuel flowing from said third duct towards said first branch duct,
   a fuel flow control valve in said communication duct,
   a further temperature sensor which senses the temperature of the fuel in said first branch duct downstream of said heater and controls said flow control valve in such a way as to cause the fuel flow through said communication duct to vary in a manner which is inversely proportional to the variation of the temperature of the fuel in said first branch duct downstream of said heater.

* * * * *